United States Patent
Pantana et al.

(10) Patent No.: US 7,599,476 B2
(45) Date of Patent: *Oct. 6, 2009

(54) SYSTEM AND METHOD FOR VOICE-MAIL AND E-MAIL SYNCHRONIZATION

(75) Inventors: John Pantana, Lynchburg, VA (US); Kevin Connelly, Lynchburg, VA (US)

(73) Assignee: Advanced Logic Industries, Inc, Blacksburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/865,472

(22) Filed: Oct. 1, 2007

(65) Prior Publication Data

US 2008/0025479 A1 Jan. 31, 2008

Related U.S. Application Data

(63) Continuation of application No. 10/895,310, filed on Jul. 21, 2004, now Pat. No. 7,286,650.

(51) Int. Cl.
*H04M 11/06* (2006.01)

(52) U.S. Cl. ............... 379/88.13; 370/466; 379/88.17; 379/220.01; 709/206; 709/238

(58) Field of Classification Search ............ 379/88.13, 379/220.01, 88.17; 709/206, 238; 370/466
See application file for complete search history.

(56) References Cited

U.S. PATENT DOCUMENTS

| | | | |
|---|---|---|---|
| 5,333,266 A | 7/1994 | Boaz et al. | |
| 5,479,411 A * | 12/1995 | Klein | 379/88.13 |
| 5,557,659 A * | 9/1996 | Hyde-Thomson | 379/88.13 |
| 5,647,002 A | 7/1997 | Brunson | |
| 5,948,059 A * | 9/1999 | Woo et al. | 709/206 |
| 5,951,638 A | 9/1999 | Hoss et al. | |
| 5,974,449 A | 10/1999 | Chang et al. | |
| 6,018,762 A | 1/2000 | Brunson et al. | |
| 6,085,231 A * | 7/2000 | Agraharam et al. | 709/206 |
| 6,295,552 B1 * | 9/2001 | Shibata | 709/206 |
| 6,317,485 B1 | 11/2001 | Homan et al. | |
| 6,360,272 B1 * | 3/2002 | Lincke et al. | 709/238 |
| 6,430,177 B1 | 8/2002 | Luzeski et al. | |

(Continued)

FOREIGN PATENT DOCUMENTS

CA 2 317 091 A1 3/2001

*Primary Examiner*—Gerald Gauthier
(74) *Attorney, Agent, or Firm*—Novak Druce + Quigg LLP

(57) ABSTRACT

Disclosed is a unified messaging system and method for combining a voice-mail system with an e-mail system. The present invention is a hybrid event driven system that polls a universal e-mail box for receipts, with the voice-mail system being fully event driven. The present invention maintains two persistent log-ins to the universal e-mail box, one to deliver messages and one to read message receipts. Thus, the system and method does not need to log-in and -out or read the entire list of messages. The present invention uses a file system instead of a state database. The system and method acts in real time such that messages in the unified messaging systems are synchronized within a pre-determined real-time. The system and method uses a "fail-safing" technique in which, after copies of messages are made and stored by each messaging component, allows one system to work if another is down.

19 Claims, 11 Drawing Sheets

FIG. 3A

U.S. PATENT DOCUMENTS

| | | |
|---|---|---|
| 6,563,912 B1 | 5/2003 | Dorfman et al. |
| 6,633,630 B1 | 10/2003 | Owens et al. |
| 6,671,567 B1 | 12/2003 | Dwyer et al. |
| 6,697,458 B1 | 2/2004 | Kunjibettu |
| 6,732,151 B1 * | 5/2004 | Tobias et al. ................ 709/206 |
| 6,792,085 B1 * | 9/2004 | Rigaldies et al. ......... 379/88.13 |
| 6,807,270 B2 | 10/2004 | Porter |
| 6,987,840 B1 * | 1/2006 | Bosik et al. ............... 379/88.17 |
| 6,999,469 B1 * | 2/2006 | Chu et al. .................... 370/466 |
| 2002/0129174 A1 * | 9/2002 | LaBaw ....................... 709/310 |

* cited by examiner

| VS Mailbox Name 321 | ES Mailbox Name 322 | e-mail address 323 |
|---|---|---|
| | | |

In-Memory Configuration Table 320

FIG. 3B

| Embedded Filename 333 | body of message 334 | read request receipt flag 331 | delete request receipt flag 332 |
|---|---|---|---| e-mail message corresponding to a voice-mail message 330

FIG. 3C

SYSTEM AND METHOD FOR VOICE-MAIL AND E-MAIL SYNCHRONIZATION

CROSS REFERENCE TO RELATED APPLICATION

The present application is a continuation under 35 USC Section 120 of U.S. patent application Ser. No. 10/895,310, filed Jul. 21, 2004, now U.S. Pat. No. 7,286,650, the entire contents of which are hereby incorporated by reference.

BACKGROUND OF THE INVENTION

1. Field of the Invention

The present invention relates to a system and method for copying voice-mails from a voice-mail system (VS) into an e-mail system (ES) and maintaining synchronization between VS and ES message states.

2. Discussion of the Related Art

Voice-mail systems are widely used by businesses to provide a means of capturing telephone messages when a caller cannot be serviced in real-time. Many approaches for coordinating and synchronizing voice- and e-mail systems have been proposed, as described in the following sections.

U.S. Pat. No. 6,697,458 B1 to Kunjibettu discloses a system and method that sends and stores a corresponding e-mail message for every voice-mail message when a voice message is stored in a user's voice-mailbox. At predetermined times the voice- and e-mail boxes are synchronized. Kunjibettu teaches creating e-mails corresponding to voice-mails and not vice versa, see FIGS. 1-3. Kunjibettu teaches that a plurality of e-mail systems may be used in conjunction with a plurality of voice-mail systems 100, col. 5 lines 58-63. In terms of architecture, Kunjibettu teaches using a timer and is not an event driven system.

U.S. Pat. No. 6,633,630 B1 to Owens et al. discloses a system for integrating electronic mail, voice-mail, and fax mail in a universal mailbox. Using a computer and a modem, message receivers may playback voice-mail, view fax mail, and read e-mail by accessing the universal mailbox via connection software. Message receivers may playback voice-mail, redirect fax mail, and "listen" to e-mail through a text-to-speech conversion (Abstract). E-mail may be converted to voice-mail, dial-out to a cellular landline may be specified, and a fax and pager may also be forward options (FIG. 6). Voice-to-text is supported for message content as well as commentary (FIG. 11). Senders and receivers of messages specify filter and forward options and user options, respectively, for in-bound voice, fax, and e-mail (FIGS. 6-15). The universal mailbox is described in FIG. 2. Owens teaches rules to govern synchronization and does not teach states of an e-mail, but only teaches copying the e-mail.

U.S. Pat. No. 6,018,762 to Brunson et al. discloses rules-based synchronization of mailboxes in a data network. Brunson teaches synchronizing the contents of commonly-owned mailboxes in disparate messaging systems (Abstract). Mailboxes are monitored for incoming messages and copies are sent to associated mailboxes. Message actions can be synchronized with respect to copies resident in associated mailboxes (col. 5, lines 64-66). Event monitoring is used by each of the message systems in a pro-active manner to accomplish synchronization of mailboxes (col. 5, line 66-col. 6 line 3). Brunson teaches auto-forwarding of messages. This method is problematic since, if there is no control on the loopback, the program can go into a runaway loop of receipts for auto-forwarded messages. Also, auto-forwarding is susceptible to delays and relies on the polling of individual mailboxes on all systems to be synchronized.

U.S. Pat. No. 5,974,449 to Chang et al. discloses an apparatus and method for multimedia messaging between disparate messaging platforms. Supported formats include any type supported by e-mail, such as, fax, e-mail, voice and extends to digitized audio, graphics file, and digitized video which may be attached to e-mail messages. A "converter" converts incoming messages of one format to a "delivery format" according to received delivery information (col. 7, line 30 et seq.) Voice to e-mail and vice versa are supported (col. 19, line 1 et seq.). Fax to e-mail and vice versa are supported (FIG. 6) and a roaming or virtual mailbox is supported (col. 14, line 16 et seq.). There is no teaching of synchronization across messaging systems of actions taken in one messaging system with respect to corresponding messages in another.

U.S. Pat. No. 5,951,638 to Hoss et al. discloses an integrated multimedia messaging system that coordinates messages received in a first messaging system with a second messaging system and includes synchronization of message content and actions across first and second messaging systems (claim 1). E-mail and voice-mail are interfaced (FIG. 3). Hoss et al. teaches an integrated messaging system that uses existing messaging systems to receive, store, retrieve and manage messages in media types and formats appropriate to each existing messaging system using protocols which are specific to each messaging system (col. 2, lines 54-67). Hoss teaches three ways to store synchronized data: 1) pointer system (not a copy); 2) copy message to each side; and 3) put all in one universal database. Hoss teaches CMC, using X.400 interface, which implies that it is a poller. Hoss teaches a state database to hold 'read' states. Hoss requires the various mail systems to log in and log out.

U.S. Pat. No. 5,647,002 to Brunson discloses a system and method for content and status synchronization of mailboxes of different types, e.g., e-mail and voice-mail (Abstract). A separate synchronizer component interfaces with the different messaging systems (FIG. 1) and maintains a database containing mailbox-pair status as entries in a state table to synchronize actions for corresponding messages in various messaging systems (FIG. 2). Individual mailboxes are polled in a paired fashion (FIG. 3). Brunson teaches a poller that sequentially goes through a mailbox, a phone record, etc. and performs message comparisons. This approach is very computer-intensive and inefficient, because it is constantly rechecking the same records over and over again. Brunson teaches a separate state database that is an additional point of failure.

U.S. Pat. No. 5,333,266 to Boaz et al. discloses an Integrated Messaging System that integrates mail from a plurality of mail servers handling messages of different media types such as text, voice, facsimile, video and image. A common in-basket is maintained for all the mail systems, and synchronization functions (FIGS. 10-11) across messaging systems are provided (Abstract, FIG. 2). In addition to the foregoing media types, OCR-to-text and vice versa are supported. Boaz teaches a proprietary protocol that can be used in unified messaging. The teaching of Boaz is limited to specific hardware and software and with very specific configurations.

U.S. Pat. No. 5,948,059 to Woo et al. teaches an integrated messaging system that uses existing messaging systems to receive, store, retrieve and manage messages in media types and formats appropriate to each existing messaging system using protocols specific to each messaging system (col. 2, lines 54-67). Woo claims an apparatus and method for replaying messages and communicating with an audio player (claims 1, 11, and 21). This is a poller system since it accesses mail boxes in a sequential fashion. Secondly, as a poller system it requires the use of a state database to minimize system resources.

U.S. Pat. No. 6,563,912 to Dorfman et al. teaches a voice server for providing integrated voice-mail and e-mail messages for use with an e-mail server and an e-mail client. Voice-mails are deleted upon receipt of corresponding e-mails. There is no synchronization of messages per se (FIG. 3). An assassin attachment is used to delete e-mail messages from the e-mail server (FIG. 10a). Dorfman does not teach handling a message 'read' state, i.e., that the message was read. It relies on SMTP to synchronize messages. Using SMTP implies that this is an auto-forward system. This method is problematic since, if there is no control on the loopback, the program can go into a runaway loop of receipts for auto-forwarded messages. Also, auto-forwarding is susceptible to delays and relies on the polling of individual mailboxes on all systems to be synchronized.

U.S. Pat. No. 6,430,177 to Luzeski et al. discloses an integration of an e-mail messaging system with a voice/fax messaging system on a messaging platform computer (Abstract). A universal inbox displays all of a subscriber's voice, fax and e-mail messages. A standard API is provided through which access to stored proprietary messages can be made (col. 4, lines 2-4). There is no voice-to-text, etc. and therefore no need for linking messages in one messaging platform to another, i.e., for purposes of synchronization. Luzeski teaches CMC using X.400 protocol functions. By virtue of using CMC, this is a poller, as discuss above for the patent U.S. Pat. No. 5,647,002 mentioned above. This invention does not deal with synchronization but rather it proposes aggregation.

U.S. Pat. No. 6,317,485 to Homan et al. discloses a system and method for integrating notification functions of messaging systems (Abstract). There are no synchronization functions and no message duplication from one system to another and therefore no deletion coordination is required between messaging systems and none is taught. Homan teaches sending an indicator only, not an entire message. Essentially, a pointer system is taught. This can be efficient, because less information is sent, and the message is copied only when requested. However, both systems must be running, so there are more points of failure.

While there are a significant number of prior art systems for integrating, interfacing and unifying various messaging systems, none addresses a significant part of the messaging installed base, namely unifying an event-based messaging system with a system that does not create events.

SUMMARY OF THE INVENTION

The present invention is a unified messaging system for combining a voice-mail system with an e-mail system that can be characterized as follows:
1) The present invention is not a poller, but a hybrid event driven system that polls only one account on one side for receipts, with the other side fully event driven. The present invention maintains two persistent log-ins, one to deliver messages and one to read message receipts. Thus, the present invention does not need to log-in and -out or read the entire list of messages.
2) The present invention uses a file system, not a state database.
3) The present invention acts in real time, that is, messages in the unified messaging systems are synchronized within a pre-determined real-time.
4) The present invention uses a "fail-safing" technique in which, after copies of messages are made and stored by each messaging component, allows one system to work if another is down. The present invention is less intensive on servers and networks and synchronizes in real-time.

The present invention is not a pointer system, and voice messages of a voice-mail system are copied to an e-mail system. If one system fails, according to the present invention, it should not effect the ability to get messages from an other system.

The present invention provides a method for handling the 'read' and 'delete' states of corresponding voice-mail and e-mail message. The present invention does not use simple mail transfer protocol (SMTP). Instead, a preferred embodiment uses OLE and Internet message access protocol (IMAP) and GroupWise (Novell) Object API and TCP/IP.

The present invention comprises two components: a Poller component that looks for message 'read' and 'delete' receipts sent to a centralized location and a Connector component that processes 'new', 'saved' and 'deleted' message actions in order to create message/voice files, send a message, and update status of 'saved' and 'deleted' messages and their counterparts.

Generally the Poller is looking for message receipts, such as 'read' and 'delete' receipts. When a 'read' receipt is received, the present invention locates the voice-mail message and updates its read status. When a 'delete' receipt is received, the present invention locates the corresponding voice-mail message and deletes the message.

The Connector component creates text and voice file counterparts for a new voice-mail message, sends the message, and embeds a link in the e-mail message so that an action taken with respect to the e-mail message is also taken with respect to the voice file. For example, when an e-mail is read, then its status becomes 'read' and so does the status of the associated voice-mail. This is especially helpful in the deletion process wherein linked messages are deleted if one linked message is deleted, without other user action.

In a second embodiment, the present invention is configured as a seamless utility to leverage the typical functionality of a third party unified messaging system, without requiring any change in e-mail platform.

Using the system and method of the present invention, voice messages are made accessible and manageable for a user, regardless of the user's current choice of message access. Messages can be accessed and managed from a variety of system entry points, including by phone, e-mail and any other device that can access a user's e-mail. The message status ('new' vs. 'read') is synchronized regardless of how the message is accessed. Voice messages can also be combined with other electronic attachments, and forwarded to recipients via e-mail.

By leveraging the capabilities of an existing e-mail system, any rules of that e-mail system can also be established to automatically route and further customize the management of voice-mail messages, e.g., forward them to other mailboxes and perform automatic processing of 'read' receipts. The system and method of the present invention eliminates duplication of message handling: message actions taken in one messaging system that result in a change in status of a message, for example, can be synchronized to reflect the same status across all linked messaging systems.

The system and method of the present invention enables management of messages anywhere connectivity can be established using a tool chosen by a user: whether it is a telephone, cell phone, desktop PC, laptop or a wireless PDA. The system and method of the present invention enables a user to share voice-mail messages along with other attachments all as one communication providing a more collaborative and informative way to share information from a variety of media possible with converged networking and IP Telephony. Using the system and method of the present invention, a user can access e-mail, documents and voice-mail messages from a single point from anywhere in the world.

The system and method of the present invention provide seamless connection to e-mail systems that users already know. Therefore, the need for additional training is minimized. A user can employ the same rules and filters for all messages, regardless of type; with no new interface to learn.

A user can manage messages in a more efficient manner. The present invention enables a user to scan, prioritize and respond to messages from the user's e-mail inbox. For example, a user can review the contents of an inbox to determine the caller for each voice message without going through the entire voice-mail inbox to retrieve that one very important message. The present invention eliminates repeated dialing-in to be sure every message is heard. The system and method of the present invention organizes voice messages the same way e-mail messages are organized so all communications can be retrieved from a single location. The present invention enables a user to automatically copy voice messages to their choice of e-mail folders to give the user more flexibility to handle them quickly and efficiently.

The system and method of the present invention minimizes message administration effort. A user can leverage the flexibility of unified messaging and an e-mail system's metrics for stability, reliability and security. The user is provided with options to realize the benefits of unified messaging coordinated with an existing e-mail installation.

The foregoing features and advantages of the present invention will become further apparent from the detailed description that follows and the accompanying drawings.

BRIEF DESCRIPTION OF THE DRAWINGS

FIG. 3B illustrates an in-memory configuration table that cross-references VS mailbox names with ES mailbox names and corresponding e-mail addresses;

FIG. 3C illustrates the format of an e-mail message created to correspond to a voice-mail message;

Figure 1:
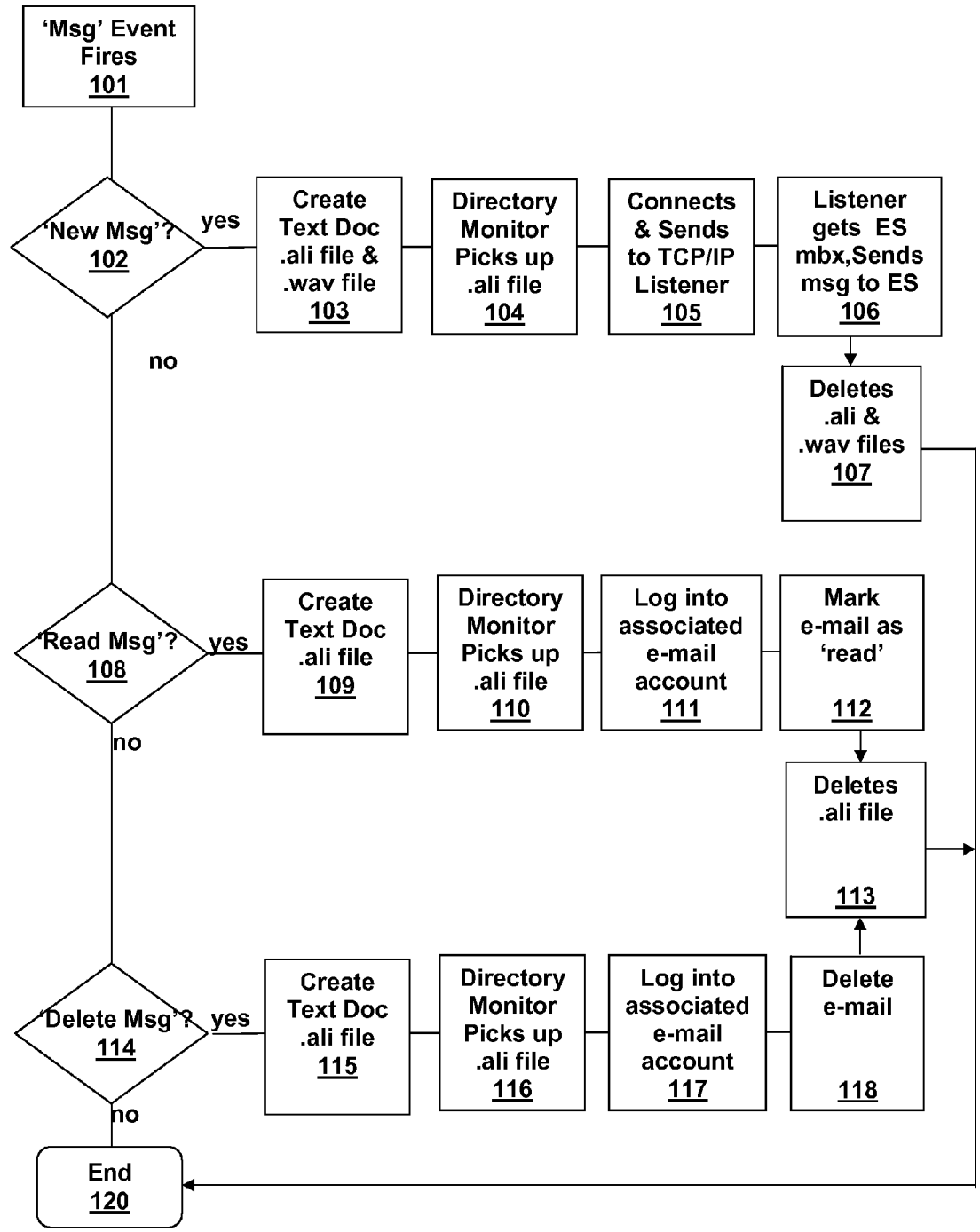
FIG. 1 illustrates an overview of copying new messages and of state changes initiated by a voice-mail device from a voice-mail system to an e-mail system, according to the present invention.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements in the various views of the Figures.

DETAILED DESCRIPTION

In the following discussions for purposes of clarity with respect to explaining the current invention, common components are numbered according to their first appearance in a drawing and well-known components are to be interpreted according to the understanding of a person ordinarily skilled in the art.

Overview

The system and method of the present invention provides a Connector component that automatically creates and copies a text counterpart for each new voice-mail message from a voice-mail system (VS) to a corresponding user's mailbox in at least one e-mail system (ES) and reflects state changes of these copied voice-mails in the at least one e-mail system that are initiated in the VS system.

The system and method of the present invention also provides a Poller component to maintain corresponding message 'read' and 'delete' states changes between the VS and the at least one ES that originate in the at least one ES.

In the system and method of the present invention both the ES and VS are able to access these messages from their respective support devices. In addition to the de facto synchronization resulting from providing a text message in an ES to correspond to a voice-mail message in a VS, the other functions provided by the system and method of the present invention include near real-time synchronization (actions in one system are reflected in the other very quickly, typically in under 5 seconds) with minimal impact on system and network resources.

The following sections provide a discussion of an abstract embodiment of the Connector and Poller by describing the necessary and ancillary processes provided. In a preferred embodiment, the system and method of the present invention employ Windows services as containers for the processes.

Controller (Connector) Component—Overview of Event Handler

Referring now to FIG. 1, the Connector is configured as a message event handler and when a message event fires at step 101 the connector determines the type of message at steps 102, 108, and 114.

If a 'New Message' event fires then a voice-mail message has been created and stored by the VS and at step 103 the connector component creates a corresponding text document and stores it and the digitized voice-mail as local files. At step 104 a Directory Monitor picks up the text file and sends it to a Listener at step 105. The Listener identifies the corresponding ES mailbox and sends the message to that mailbox at step 106 and when the corresponding e-mail message is successfully received by the ES the Monitor cleans up, i.e., deletes, the locally stored files at step 107. A "universal e-mail box" is specifically set up and used to send all voice mails to an appropriate email user account. All voice mails are channeled through the universal e-mail box account.

If a 'Read Message' event fires in the VS, a voice-mail message has been read by the VS and at step 109 the VS creates one text file to communicate this read event to the ES. At step 110 a Directory Monitor picks up the text file and at step 111 identifies and logs in to the associated ES e-mail account. Then, at step 112 the Directory Monitor marks corresponding e-mail message as 'read'. When this e-mail message is successfully marked as 'read' the Directory Monitor cleans up, i.e., deletes, the locally stored file at step 113.

If a 'Delete Message' event fires in the VS a voice-mail message has been deleted by the VS and at step 115 the VS creates one text file to communicate this delete event to the ES. At step 117 a Directory Monitor picks up the text file and at step 117 identifies and logs in to the associated ES e-mail account. Then at step 118 the Directory Monitor deletes the corresponding e-mail. When the corresponding e-mail message is successfully deleted the Directory Monitor cleans up, i.e., deletes, the locally stored file at step 113.

Event handling by the Connector component ends at step 120.

Poller Component—Processing 'read' and 'delete' Receipts Sent by the ES

Figure 2:
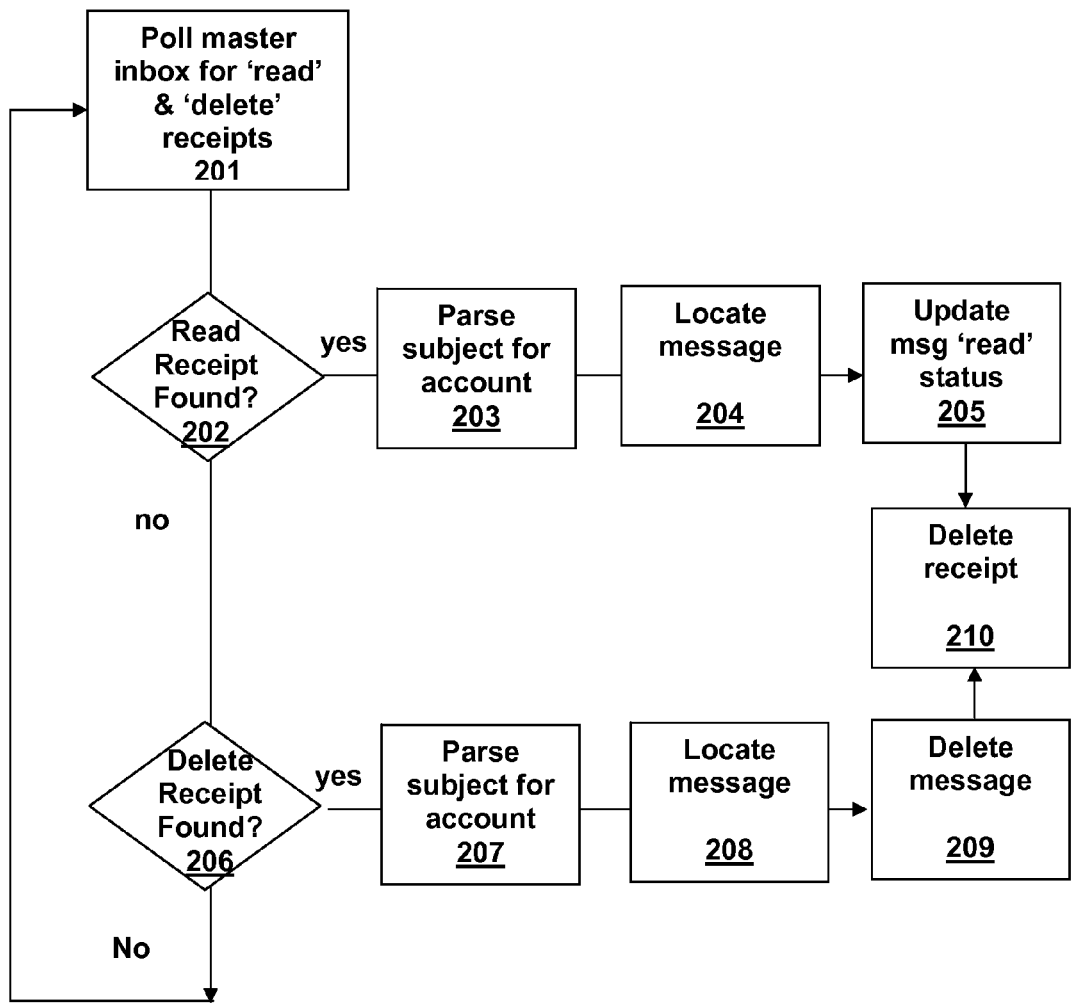
FIG. 2 illustrates a processing flow of marking previously copied messages in an e-mail system as 'read' in the voice-mail system that are 'read' by a an e-mail client application, according to the present invention.

Referring now to FIG. 2, at step 201 a master inbox receives all ES 'read' and 'delete' receipts for messages created in the ES by the VS, i.e., by the Connector component. At step 202 it is determined whether the receipt is a 'read' receipt and if it is then at step 203 the subject of the 'read' receipt is parsed for an identifier of the corresponding VS voice-mail message. At step 204 the corresponding VS voice-mail message is located using an in-memory configuration table (preferably a cross reference table illustrated in FIG. 3B), and at step 205 the corresponding VS voice-mail is marked as 'read'. Upon successful completion of step 205 the 'read' receipt is deleted in step 210

Similarly, at step 206 it is determined whether the receipt is a 'delete' receipt and if it is then at step 207 the subject of the 'delete' receipt is parsed for an identifier of the corresponding VS voice-mail message. At step 208 the corresponding VS voice-mail message is located using an in-memory configuration table (preferably a cross reference table illustrated in FIG. 3B), and at step 209 the corresponding VS voice-mail is deleted from the VS. Upon successful completion of step 209 the receipt is deleted in step 210.

The following sections provide a detailed description of the invention from a process aspect.

Copy Message From VS to ES—Process A

Figure 3A:
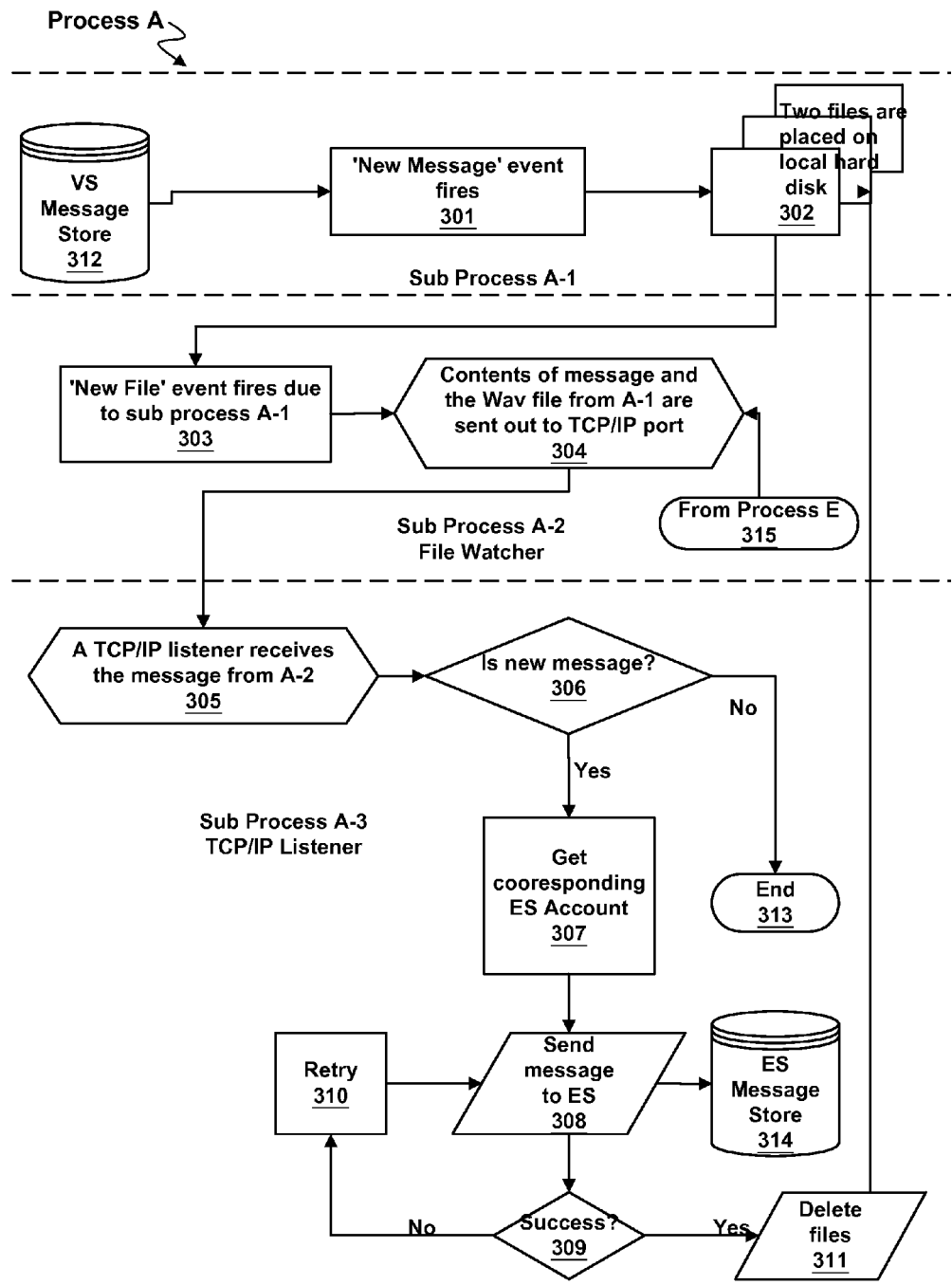
FIG. 3A illustrates a processing flow for creation of an e-mail message in an e-mail system when a new voice-mail message is created and stored in a voice-mail system.

Referring now to FIG. 3A, the first step in process A extends a VS by adding functionality to the 'New Message' event of the VS (sub-process A-1). A new voice-mail message is received and stored in VS message store 312 causing a 'New Message' event to fire at step 301. As a result of this event firing, at step 302 two files are placed on a local hard disk. At step 303 a 'New File' event fires and the contents of the message and the .wav file are sent out to a TCP/IP port at step 304. At step 305, a TCP/IP listener receives the files and determines if the message is new at step 306. If the message has been sent before then processing ends at step 313 since the message is not a new message. If the message has not been sent before, i.e., it is a new message, at step 307 the corresponding ES account is obtained and a message is sent to the ES account at step 308. The message is sent until it is successfully sent at steps 308-310 and stored in an ES message store 314. Once the message has been successfully sent, the two files placed on local hard disk for this voice-mail message are deleted at step 311. In a preferred embodiment, Microsoft Exchange™ 'event sinks' are used. While Microsoft Exchange™ is usually considered an ES, Cisco Unity™ employs it as the data store and in this case can be considered a VS system.

An advantage of using this event-driven approach is that messages are only accessed once in order to be copied to the ES message store 314 versus a polling system that must constantly reread messages and compare them to messages in the target system. Another advantage is that messages are immediately copied.

Sub-process A-1 copies the newly created digitized voice-mail data (in this scenario a .wav file) to an online-storage device that, in a preferred embodiment, is the local hard disk 312 at step 302 of the VS. In this preferred embodiment, the file creation name is derived from a datetime stamp with precision to $\frac{1}{1000}$ of a millisecond with the extension of 'wav' and the file is copied into a pre-configured directory. Sub-process A-1 also creates a secondary file whose name is a concatenation of the datetime stamp as in the wav file and also the VS mailbox name of the voice-mail, the event that fired (in this case the 'New Message' event) and the voice-mail subject line. These additional items are each separated by a hyphen and the filename's extension in this case is 'ali'.

Therefore, the two files stored by step 302 are named:
f(datetime stamp).wav
f(datetime stamp)-voice_mailbox_name-'new'-voice-mail_subject line.ali At this point the event processing is complete. While the sub-process A-1 could carry out the entire Process A to completion (i.e. the delivery of the voice-mail into the ES) more of a burden would be placed on the VS. In a preferred embodiment, the protocol used by sub-process A-1 is Microsoft™ OLE™.

The next sub-process (A-2) is known as a file watcher. An event monitor is placed on the file system 302 where Sub-process A-1 drops off messages. As soon as a message is laid down by Sub-process A-1, and event fires at step 303 and Sub-process A-2 picks it up and sends it off to Sub-process A-3 at step 304. In a preferred embodiment, Sub-process A-2 is a multithreaded process that provides for extreme scalability (i.e., the ability to handle many messages simultaneously). The messages are sent to Sub-process A-3 via TCP/IP at step 304.

Sub-process A-3 is a TCP/IP Listener. Its primary function is to listen for messages on a pre-configured I/P port and pass those messages on to the ES (e.g., in a preferred embodiment, Novell Groupwise™). When messages are received at step 305 they are placed in a memory-based queue if they do not already exist in that queue (the purpose of the decision step 306). Under normal operations, messages never already exist in the memory-based queue but could in the case of a network malfunction. Sub-process A-3 is a single threaded process that is always instantiated and always logged into the ES. Sub-process A-3 is logged into the ES under a pre-configured account not assigned to any user but specifically created for the present invention. An advantage of this technique is better performance since it maintains only one connection so that there is no need to constantly undergo time-consuming ES logon/logoff operations. At step 307, Sub-process A-3 parses out the VS mailbox name 321 from the message and compares it to entries in an in-memory configuration table 320, see FIG. 3B, to obtain a corresponding ES mailbox name 322 and e-mail address 323. Sub-process A-3 then sends the voice-mail to the ES through the ES native protocol at step 308 (e.g., in Groupwise™ this is an Object API which in turn is based on MAPI). The message is sent via the Object API 'send method'. When the e-mail message corresponding to the voice-mail message in 330 is sent, it is flagged for read request receipt required 331 and delete-request receipt required 332, see FIG. 3C. These receipts are required by the Poller comprising processes D and E, described below. Sub-process A-3 also attempts to reconnect at step 310 to the ES if a connection error is detected (not illustrated in FIG. 3A). The message that is sent embeds the filename in the e-mail message subject 333. This embedded filename serves as an identifier of message pairs (VS and the copied ES counterpart). Process A is now complete.

Mark Message Read By VS As 'read' In ES—Process B

Figure 4:
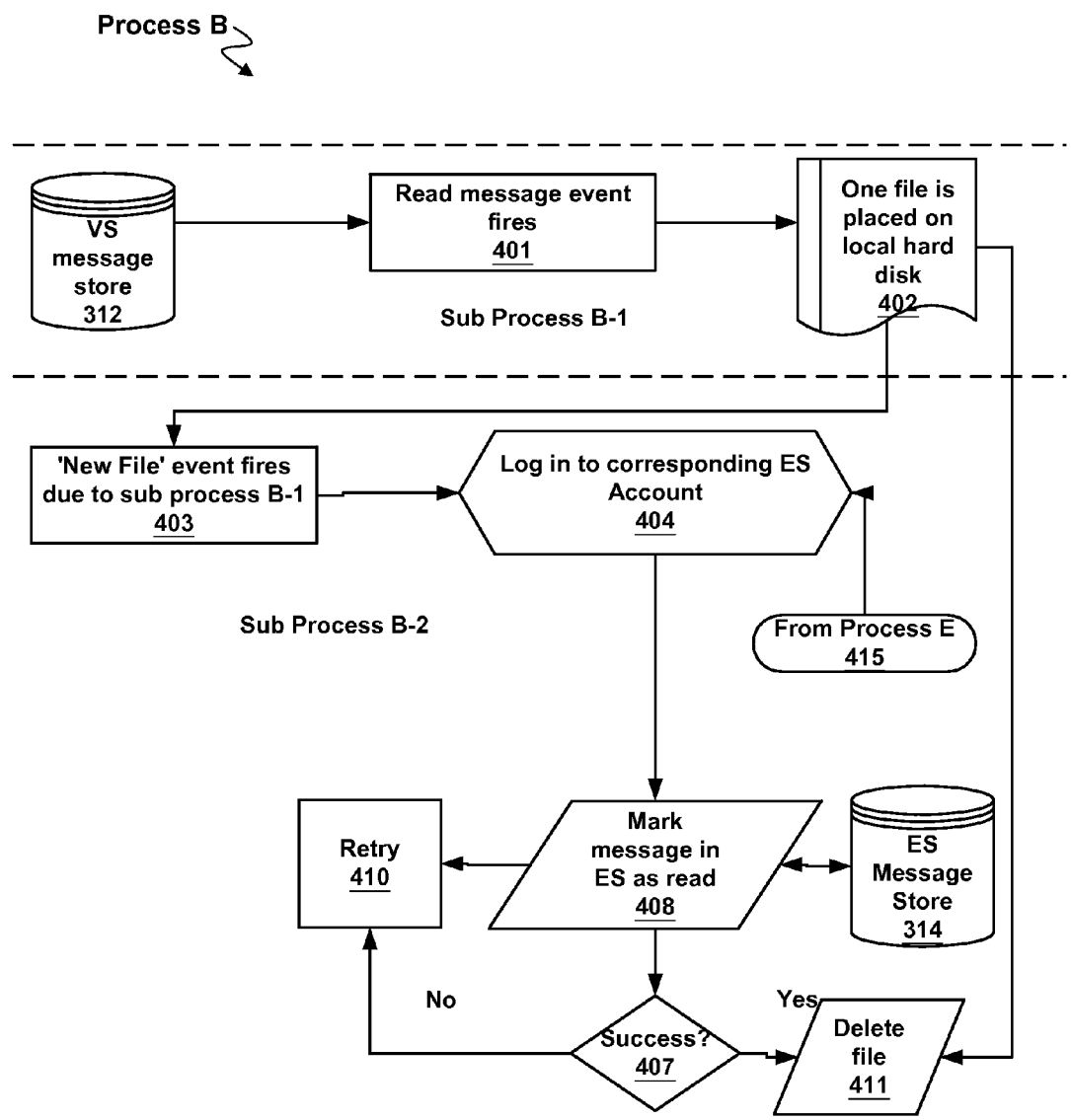
FIG. 4 illustrates a processing flow for marking previously copied messages in an e-mail system as 'read' that are read by a voice-mail system device (typically, a client software application or web browser)

Referring now to FIG. 4, A VS user via a VS device (e.g., typically a telephone) listens to the user's voice-mail. This in turn triggers the voice-mail to be marked 'read' in the VS message store 312 and fires a 'read event' 401. The first step in Process B extends a VS by adding functionality to the 'received new mail' event of the VS (Sub-process A-1). Marking the voice-mail message as 'read' in VS message store 312 causes a 'Read Message' event to fire at step 401. As a result of this event firing, at step 402 one file is placed on local hard disk having file name:

f(datetime stamp)-voice_mailbox_name-'read'-voice-mail_subject line.ali

The file monitor picks up this new file, parses out the voice mailbox name and then at step 404, via the cross reference table of FIG. 3B, logs in to the corresponding ES e-mail account. At step 408 the file monitor queries the account for the associated message and marks it as 'read'. Once the message has been successfully marked as 'read', the file placed on local hard disk for this message is deleted at step 411. In a preferred embodiment, this function is accomplished using Microsoft Exchange™ 'event sinks' technology. While Microsoft Exchange™ is usually considered an ES, Cisco Unity™ employs it as the data store and in this case it can be considered a VS system.

Sub-process B-1 creates a file whose name is a concatenation of the date time stamp as and the mailbox name of the voice-mail, the event that fired (in this case the 'read' event) and the voice-mail subject line. These additional items are separated by a hyphen and the filename's extension in this case is 'ali'. The file stored by step 402 is named:

f(datetime stamp)-voice_mailbox_name-'read'-voice-mail_subject line.ali

At this point the 'Read Message' event processing is complete.

The next Sub-process (B-2) is known as a file watcher. An event monitor is placed on the file system 402 where Sub-process B-1 drops off messages. As soon as a message is laid down by sub-process B-1, Sub-process B-2 picks it up. Sub-process B-2 is a multithreaded process that provides for extreme scalability (i.e., the ability to handle many messages simultaneously).

Sub-Process B-2 sets the 'read' property. In a preferred embodiment this is done by invoking the "open" method within the Object API. When messages are read via this API, receipts are not generated even if one is required. In this embodiment, the present invention need not address the possibility of a "loop backed" message scenario where VS tells ES a message is 'read' and ES then generates a read receipt that marks the originating ES as 'read' and initiates a "New Message" event, etc. In an embodiment requiring protection, the read state of the VS message is marked as 'read' only if it is in the 'unread' state. Finally, the file previously placed on the local hard disk is deleted at step 411.

Delete Message In ES When Corresponding Message Is Deleted in VS—Process C

Figure 5:
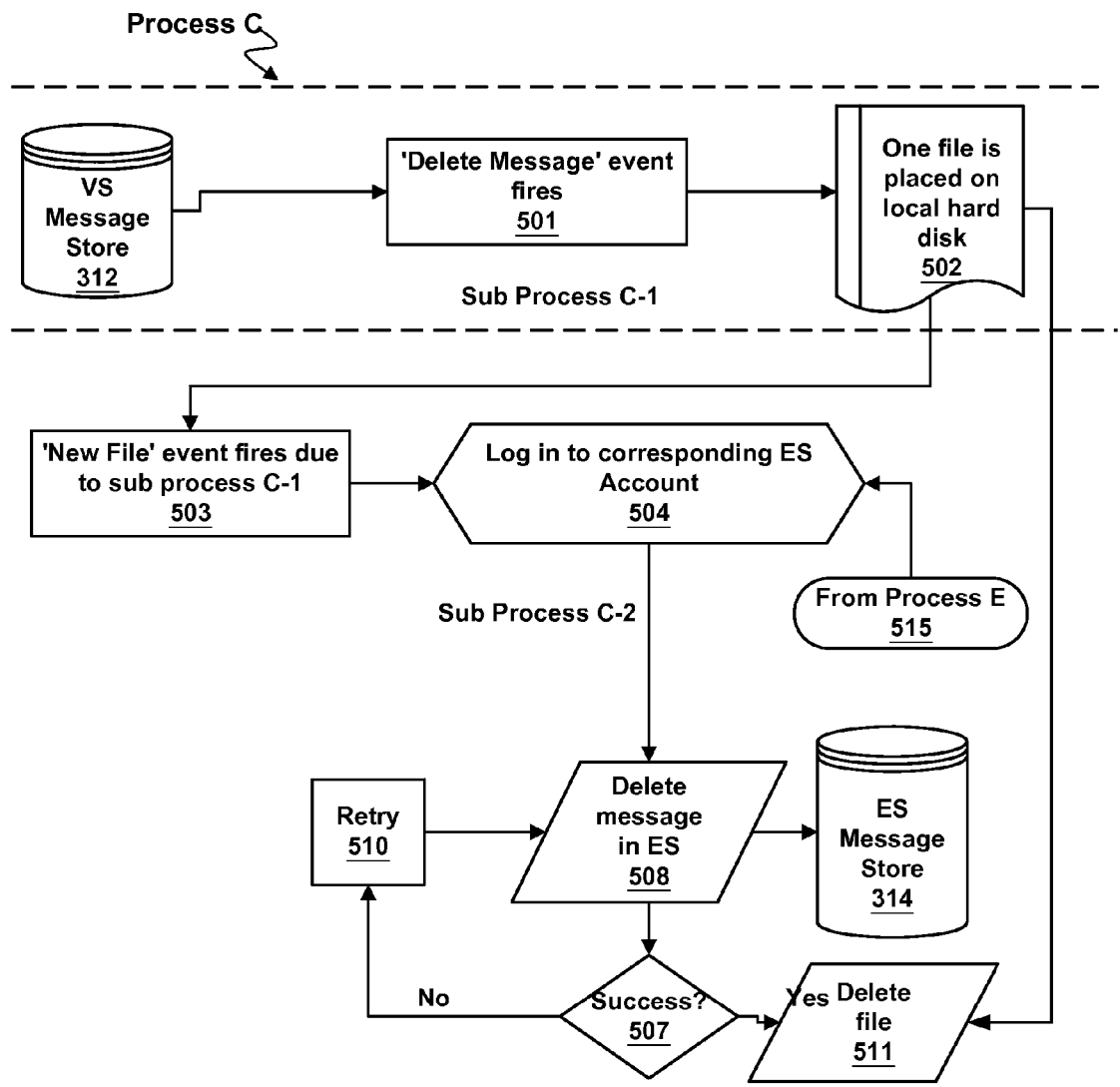
FIG. 5 illustrates a processing flow for deletion of previously copied messages in an e-mail system that are deleted by a voice-mail system.

Referring now to FIG. 5, In a preferred embodiment, Process C is virtually identical to Process B. It contains two sub-processes that encompass essentially the same technologies/protocols as Process B. The filename placed on the local hard disk at step 502 in Sub-Process C-1 contains the word "delete" instead of the word "read". Also, Sub-process C-2 deletes the message at step 508 (in a preferred embodiment deletion is via the Object API delete method).

A VS user via a VS device (e.g., typically a telephone) deletes the user's voice-mail. This in turn triggers the voice-mail to be marked 'deleted' in the VS message store 312 and fires a 'delete event' 501. Marking the voice-mail message as 'deleted' in VS message store 312 causes a 'Delete Message' event to fire at step 501. As a result of this event firing, at step 502 one file is placed on local hard disk having file name:

f(datetime stamp)-voice_mailbox_name-'deleted'-voice-mail_subject line.ali

The file monitor picks up this new file, parses out the voice mailbox name and then at step 504, via the cross reference table of FIG. 3B, logs in to the corresponding ES e-mail account. At step 508 the file monitor queries the account for the associated message and deletes it. Once the message has been successfully deleted, the file placed on local hard disk for this message is deleted at step 511. In a preferred embodiment, this function is accomplished using Microsoft Exchange™ 'event sinks' technology. While Microsoft Exchange™ is usually considered an ES, Cisco Unity™ employs it as the data store and in this case it can be considered a VS system.

Sub-process C-1 creates a file whose name is a concatenation of the date time stamp as and the mailbox name of the voice-mail, the event that fired (in this case the 'deleted' event) and the voice-mail subject line. These additional items are separated by a hyphen and the filename's extension in this case is 'ali'. The file stored by step 502 is named:

f(datetime stamp)-voice_mailbox_name-'deleted'-voice-mail_subject line.ali

At this point the 'Delete Message' event processing is complete.

The next Sub-process (C-2) is known as a file watcher. An event monitor is placed on the file system 502 where Sub-process C-1 drops off messages. As soon as a message is laid down by sub-process C-1, Sub-process C-2 picks it up. Sub-process C-2 is a multithreaded process that provides for extreme scalability (i.e., the ability to handle many messages simultaneously).

Sub-Process C-2 deletes the corresponding e-mail message. In a preferred embodiment this is done by invoking the "delete" method within the Object API. Finally, the file previously placed on the local hard disk is deleted at step 511.

Mark Message Read In ES As 'Read' In VS—Process D

Figure 6:
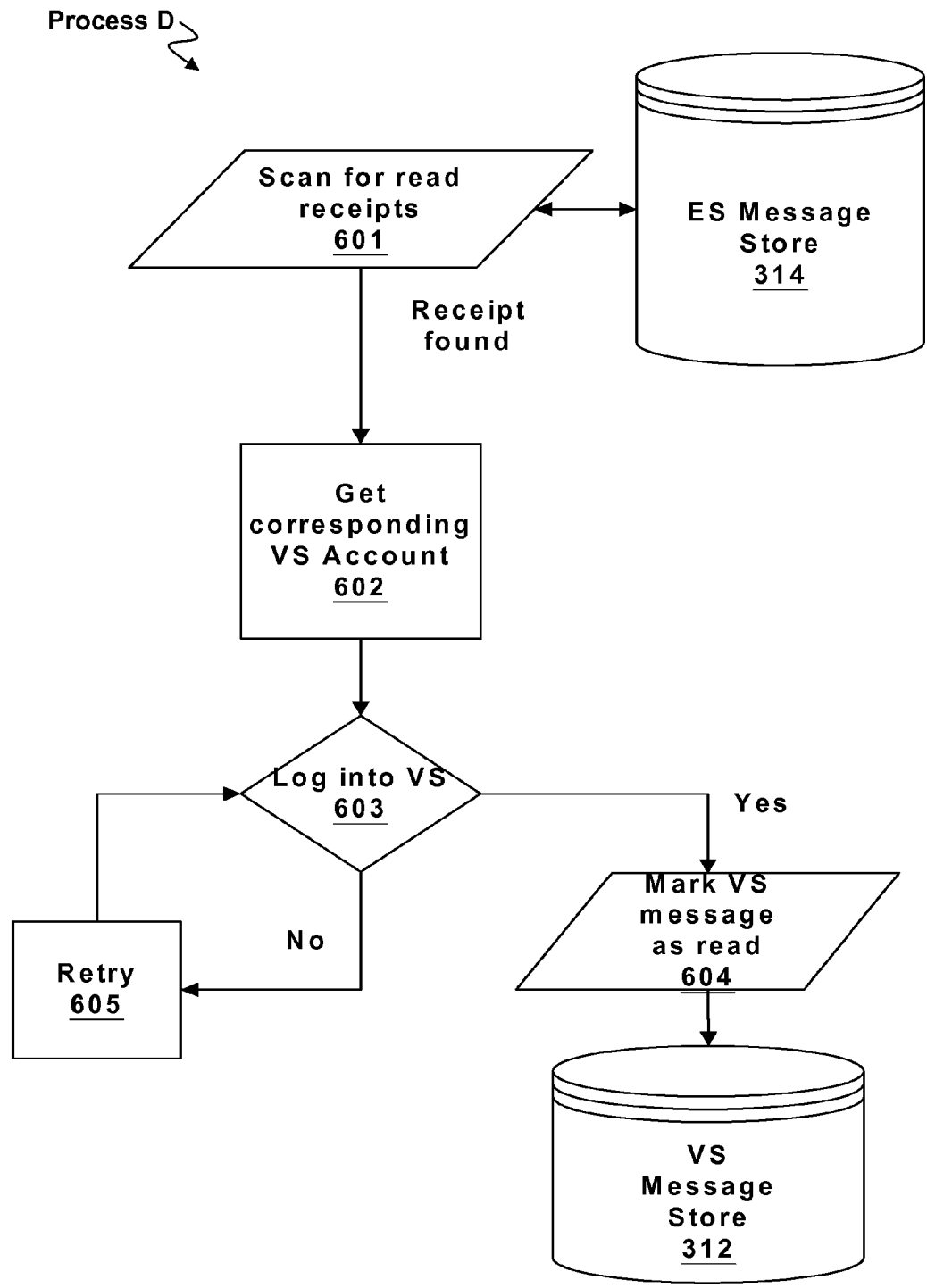
FIG. 6 illustrates a processing flow for marking messages in a voice-mail system as read that are read by an e-mail system (client software application or Web browser)

Referring now to FIG. 6, step 601 Process D begins as a persistently instantiated process that is constantly querying the read receipts folder of the "master" ES mailbox account employed by Sub-Process A-3. Process D maintains a single persistent connection with the ES (with connection drop detection). At step 602, when a read receipt is found, Process D looks up the corresponding VS account in the memory configuration table illustrated in FIG. 3B. Process D then establishes a connection to the VS (in a preferred embodiment via IMAP) and at step 603 logs into the appropriate VS mailbox (account) 321. Process D uses an administrative account that has permissions in all VS mailboxes for the login. Upon successful completion of the login, Process D then queries the VS for the corresponding message and marks it 'read'. Finally, Process D deletes the read receipt from the ES system (step not shown in FIG. 6).

Delete Message In VS When Corresponding Message is Deleted in ES—Process E

Figure 7:
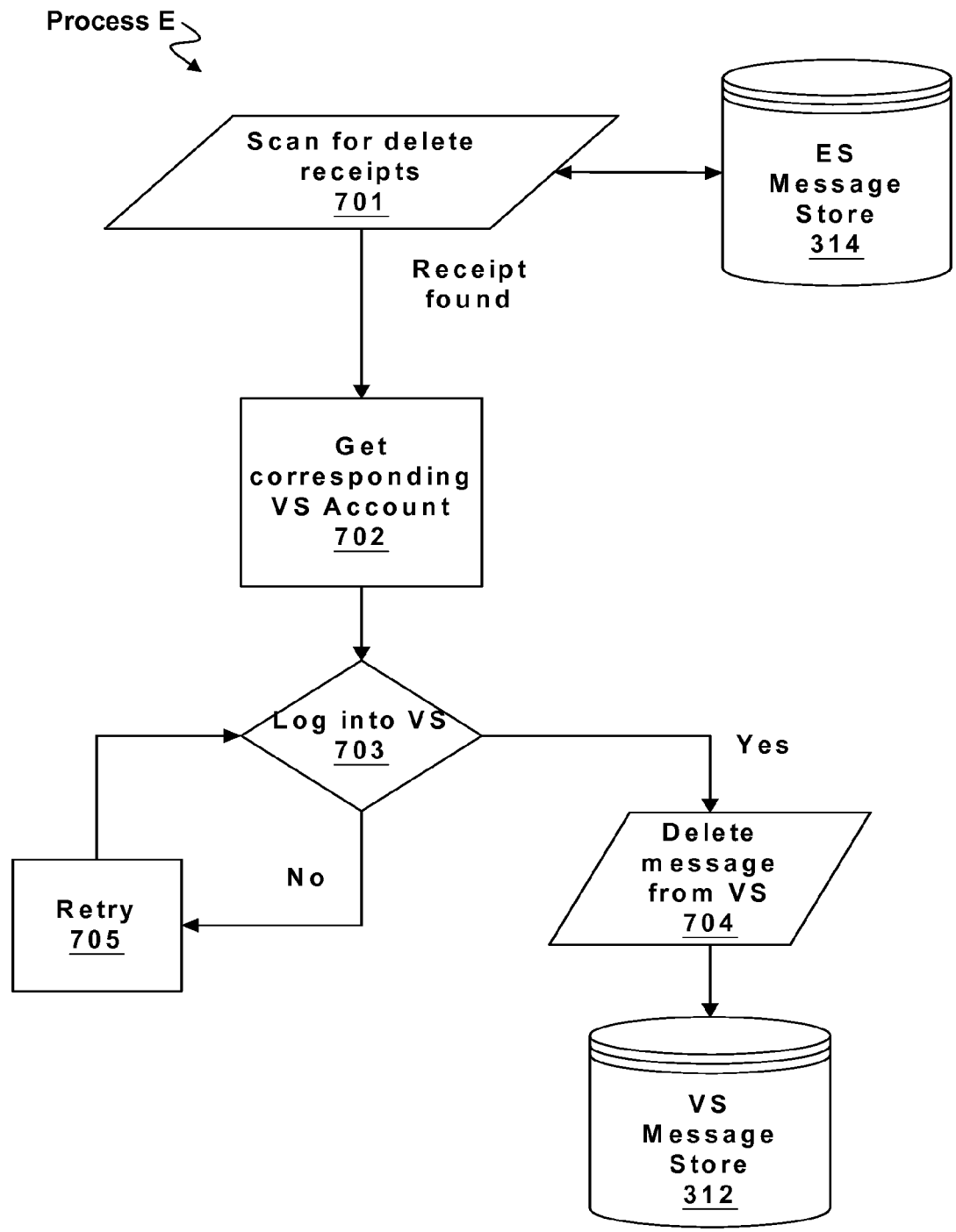
FIG. 7 illustrates a processing flow for deleting message in a voice-mail system that are deleted by an e-mail system.

Referring now to FIG. 7, step 701 Process E begins as a persistently instantiated process that is constantly querying the delete receipts folder of the "master" ES mailbox account employed by Sub-Process A-3. Process E maintains a single persistent connection with the ES (with connection drop detection). When a delete receipt is found, at step 702 Process E looks up the corresponding VS account in the memory configuration table illustrated in FIG. 3B. Process E then establishes a connection to the VS (in a preferred embodiment via IMAP) and at step 703 logs into the appropriate VS mailbox (account) 321. Process E uses an administrative account that has permissions in all VS mailboxes for the login. Upon successful completion of the login, at step 704 Process E then queries the VS for the corresponding message and deletes it. Finally, the Process E deletes the delete receipt from the ES system (step not shown in FIG. 7).

Deliver 'Orphaned' Messages—Process F

The purpose of this process is to deliver 'orphaned' messages. Orphaned messages can occur if some sort of unrecoverable error occurs (such as a downed network) while a message or message state is being delivered from the VS to the ES. Since the VS is event driven and events only fire once for a particular message event, messages can get lost if a critical system error occurs after the particular message event fires but prior to successful delivery of the particular message to the ES.

Figure 8:
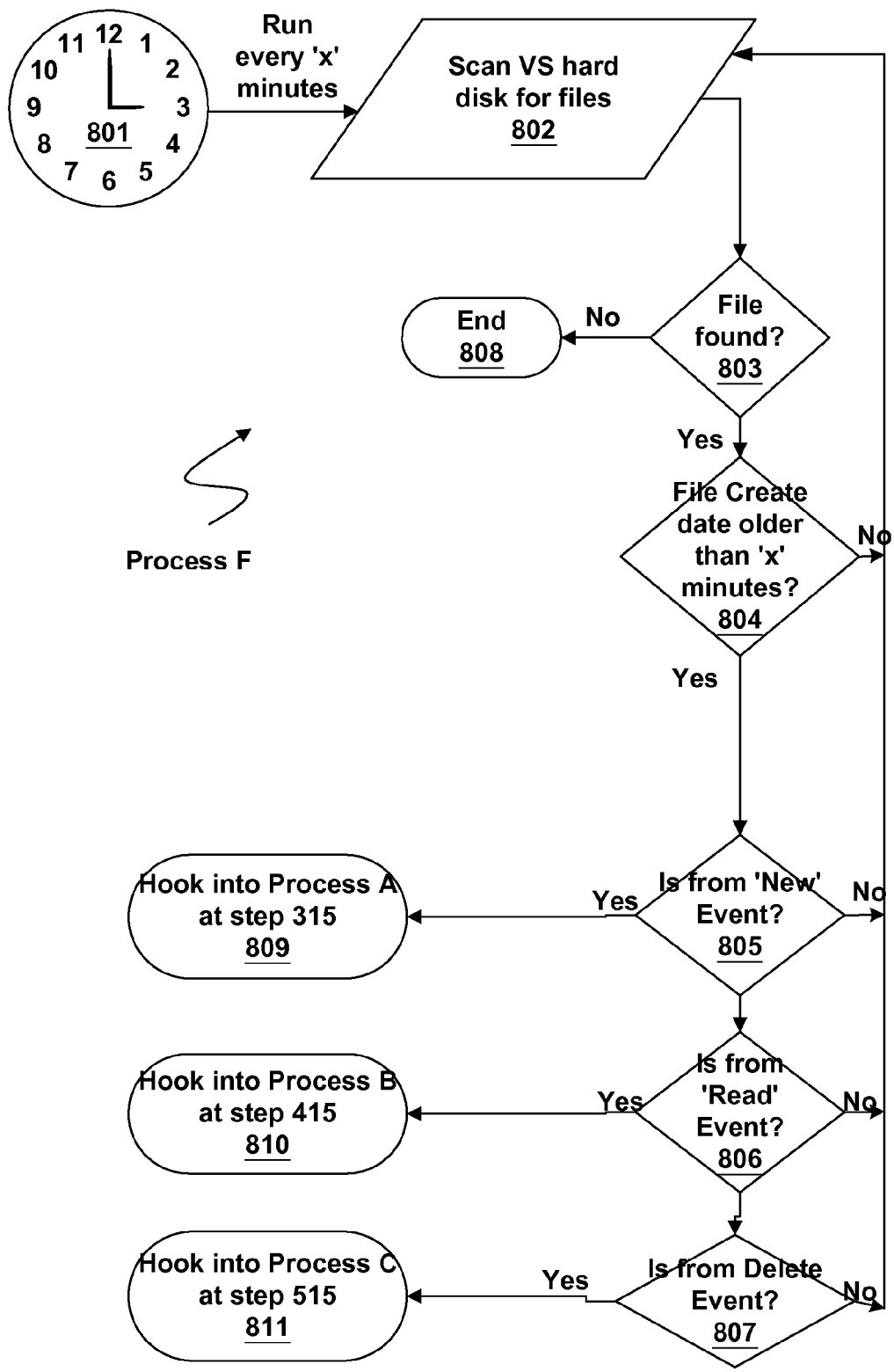
FIG. 8 illustrates a processing flow to check for orphaned, undelivered messages resulting from a network delivery failure (e.g. downed systems)

Referring now to FIG. 8, this process works off a timer 801. At a pre-determined interval 'x', at step 802, this process checks the pre-configured local directory of the VS for files created by any of Processes A, B and C at steps 302, 402 and 502, respectively. If no file is found at step 803, Process F ends at step 808. If at least one file is found at step 803 and if step 804 finds that the datetime stamp of the at least one file is older then 'x' minutes, Process F assumes the message is an orphan. Process F then delivers the message, at steps 809, 810, and 811, respectively, to the ES using the appropriately selected mechanism selected by step 805, 806, and 807 according to the message type, to one of Processes A, B and C.

Monitor Processes—Process G

Figure 9:
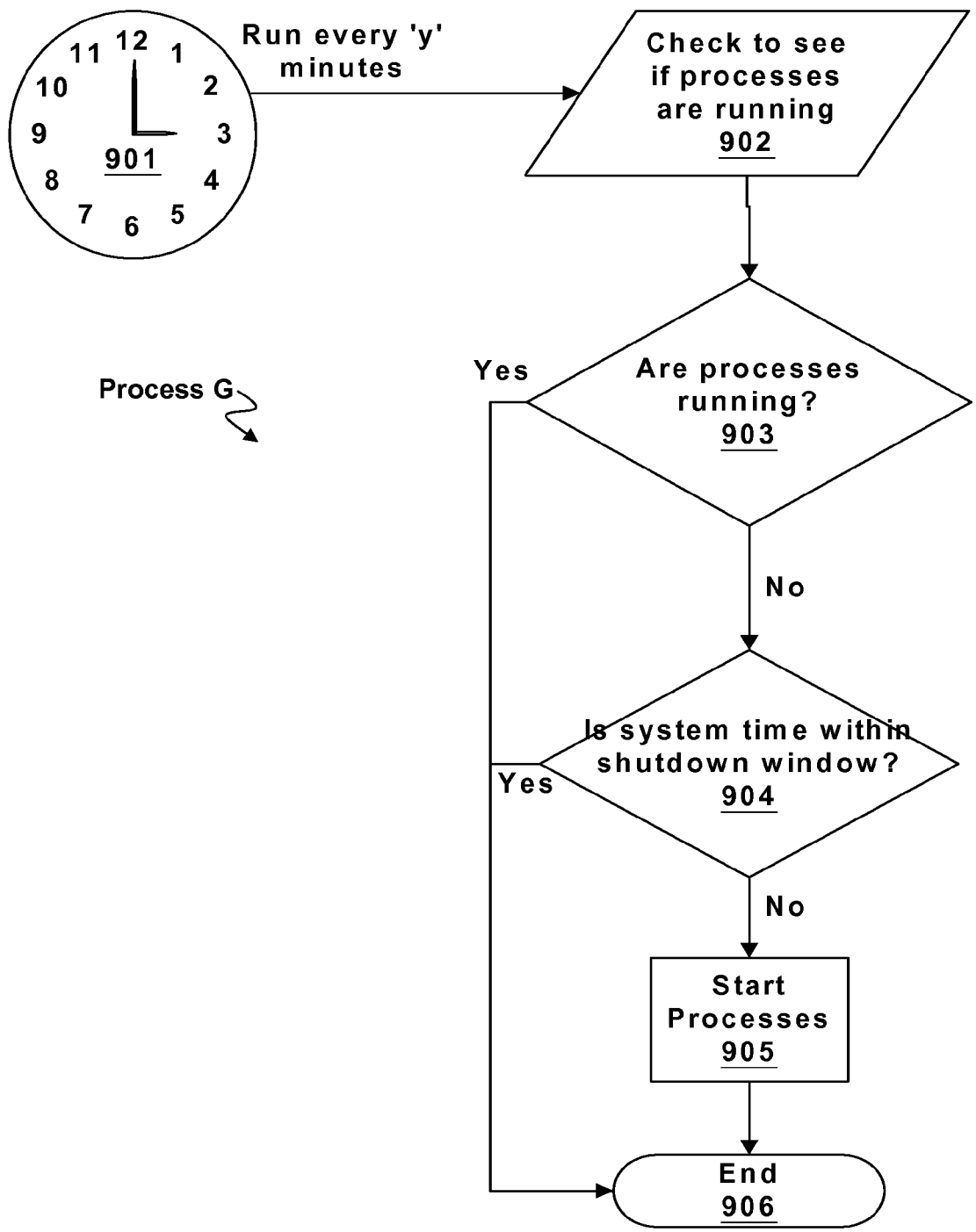
FIG. 9 illustrates a processing flow to check that all necessary processes are running.

Referring now to FIG. 9, processes associated with the system and method of the present invention are monitored. In a preferred embodiment, the existence of these processes is checked using the servicecontroller class in Microsoft .Net. A timer 901 fires at a pre-determined interval 'x' and if the servicecontroller status property does not equal "started" at step 903, the process is started at step 905. The only exception to this rule is when the current VS system datetime is within a scheduled "shut down" window, checked at step 904, and as described in the following section.

Shutdown/Startup Processes—Process H

Figure 10:
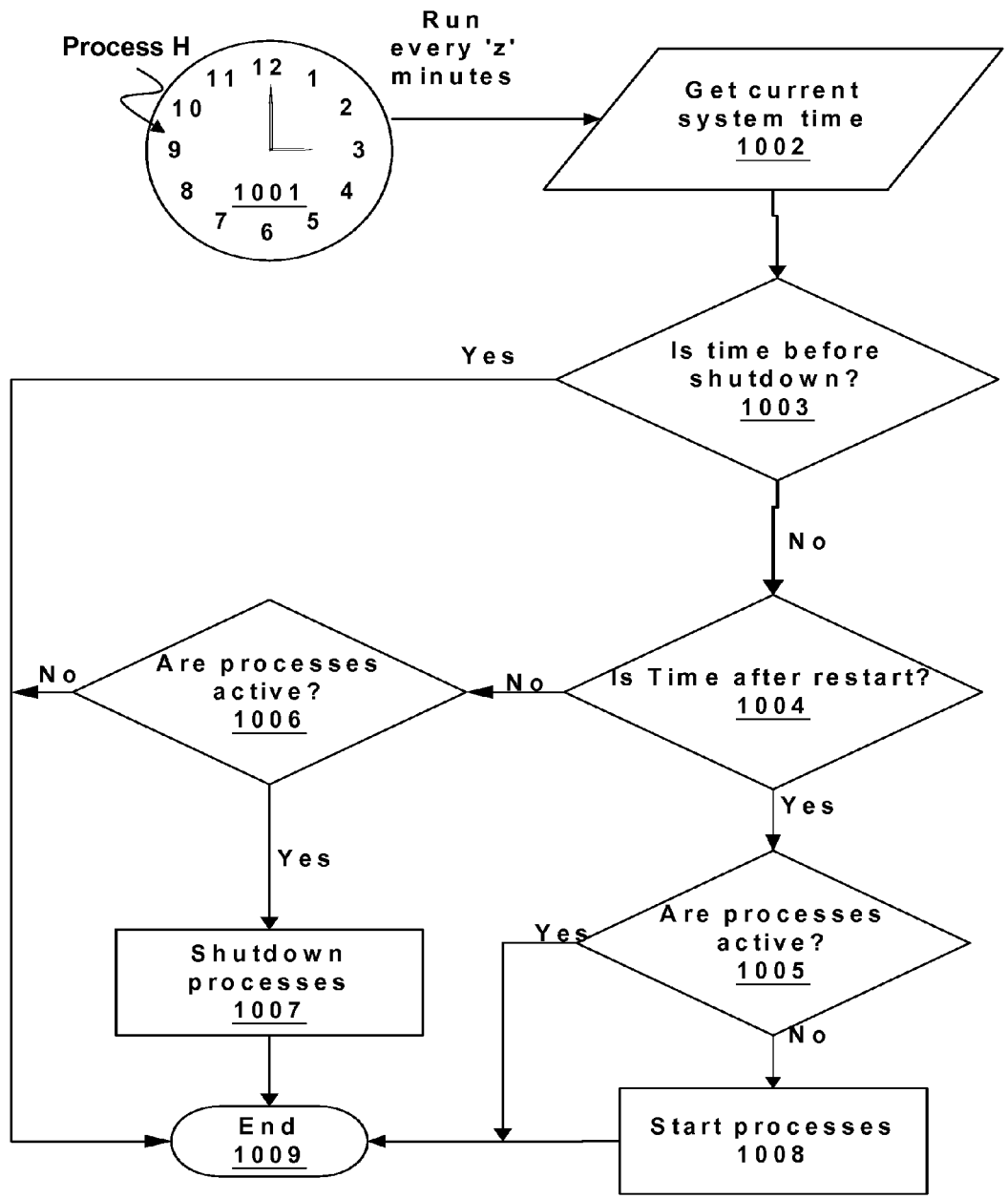
FIG. 10 illustrates a processing flow to schedule the shutdown of all other processes to prevent any interference with scheduled administrative services that may be present (e.g. nightly backup).

Referring now to FIG. 10, in a preferred embodiment, at step 1005 currently active processes are accessed, preferably via the Microsoft .Net servicecontroller class, and at step 1007 these currently active processes are shut down at a first pre-determined time. At a second pre-determined time step 1008 these same processes are started. Startup/Shutdown can be configured to run at specific times or days of the week. Startup/Shutdown scheduling is configured with a configuration tool.

While preferred embodiments have been shown and described, various modifications and substitutions may be made thereto without departing from the spirit and scope of the present invention. Accordingly, the present invention is limited to the scope of the appended claims, and the present invention has been described by way of illustrations and not limitations.

We claim:

1. A unified messaging system, comprising:

identifier means for identifying a corresponding e-mail box of an e-mail system for a voice mail-box of a voice-mail system;

a connector component configured as an event handler that for at least one message event for the voice-mail box, uses the identifier means to identify the corresponding e-mail box and causes at least one message transaction for the corresponding e-mail box;

receiver means for receiving at least one transaction receipt for message transactions from the e-mail box that corresponds to the voice-mail box; and a poller component configured to poll for the at least one transaction receipt from the e-mail box, to use the means to identify the corresponding voice-mail box, and to cause at least one action in the voice-mail box.

2. The system of claim 1, wherein the identifier means is selected from the group consisting of a cross-reference table and a hash table.

3. The system of claim 1, wherein:

the receiver means is a universal e-mail box; and the connector is persistently logged into the universal e-mail box.

4. The system of claim 1, wherein the at least one transaction receipt is selected from the group consisting of a read receipt and a delete receipt.

5. The system of claim 1, wherein:

the at least one transaction receipt is selected from the group consisting of a read receipt and a delete receipt; and the at least one action is respectively selected from the group consisting of:

i. the status of the counterpart voice-mail message is set to read in the corresponding voice-mail box; and ii. the counterpart voice-mail is deleted from the corresponding voice-mail box.

6. The system of claim 1, wherein:

the at least one message event is a type selected from the group consisting of new voice-mail message, read voice-mail message, and delete voice-mail message; and the at least one message transaction is respectively selected from the group consisting of:

i. a new e-mail message is created from a new voice-mail message and sent to the corresponding e-mail box, the new e-mail message having a status and at least one designated type of transaction receipt such that the new e-mail message and the new voice-mail message are a counterpart e-mail message to a counterpart voice-mail message and vice versa, ii. the counterpart e-mail message is located and the status is set to read in the corresponding e-mail box, and iii. the counterpart e-mail message is located and deleted from the corresponding e-mail box.

7. The system of claim 6, wherein:
each new voice-mail message is assigned a unique identifier;
the unique identifier is included in the counterpart new e-mail message;
the unique identifier of a read voice-mail message is used to locate the counterpart e-mail message in the corresponding e-mail box; and
the unique identifier of a delete voice-mail message is used to locate the counterpart e-mail message in the corresponding e-mail box.

8. The system of claim 7, wherein the unique identifier is included in the subject of the counterpart new e-mail message.

9. The system of claim 8, wherein:
the at least one transaction receipt is selected from the group consisting of read receipt and delete receipt; and
the at least one action is respectively selected from the group consisting of:
  i. the counterpart voice-mail message is located and the status is set to read in the corresponding voice-mail box; and
  ii. the counterpart voice-mail message is located and deleted from the corresponding voice-mail box.

10. The system of claim 9, wherein the unique identifier is obtained from a subject line of the email that corresponds to the transaction receipt.

11. The system of claim 10, wherein the unique identifier is date-time stamped concatenated with voice-mail box name.

12. The system of claim 9, wherein:
the unique identifier of the counterpart voice-mail message included in a subject of a read e-mail receipt is used by the poller component to log onto the voice-mail system and to locate the counterpart voice-mail message in the corresponding voice-mail box; and
the unique identifier of the counterpart voice-mail message included in a subject of a delete e-mail receipt is used by the poller component to log onto the voice-mail system and to locate the counterpart voice-mail message in the corresponding voice-mail box.

13. The system of claim 6, wherein the connector component is further configured to:
create a file in the voice-mail system for the at least one message event, having a file name including a create date-time stamp of the occurrence of the message event and the type of message event; and
when the at least one message transaction is effected in the e-mail system, deleting the file in the voice-mail system.

14. The system of claim 13, wherein the connector component is further configured to determine if the date-time stamp of the file in the voice-mail system is older than a predetermined value, the connector component is further configured to cause at least one message transaction respectively selected, according to whether the type of message event is new voice-mail message, read voice-mail message and delete voice-mail message, from the group consisting of:
  i. a new e-mail message is created from a new voice-mail message and sent to the corresponding e-mail box, the new e-mail message having a status and at least one designated type of transaction receipt such that the new e-mail message and the new voice-mail message are a counterpart e-mail message to a counterpart voice-mail message and vice versa;
  ii. the counterpart e-mail message is located and the status is set to read in the corresponding e-mail box; and
  iii. the counterpart e-mail message is located and deleted from the corresponding e-mail box.

15. The system of claim 1, further comprising a system management component including:
a monitor component that periodically starts the connector and poller components if they are not already running; and
a startup/shutdown component that periodically determines:
  i. when a current system time is before a shutdown and after a restart and starts the connector and poller components if they are not already running, and
  ii. when a current system time is before shutdown and before a restart and shuts down the connector and poller components if they are running.

16. A method for synchronizing contents of an e-mail box of an e-mail system with contents of a voice-mail box of a voice-mail system, comprising the steps of:
providing a universal e-mail box in the e-mail system;
maintaining by an event handler, a persistent log-on to the universal e-mail box for the purpose of delivering e-mail counterparts to voice-mail messages;
when a message event occurs to an existing voice-mail message in the voice-mail system, the event handler logging in to the corresponding e-mail box to effect a corresponding message transaction in the e-mail system;
periodically polling the universal e-mail box for transaction receipts; and
when a transaction receipt is found in the universal e-mail box, causing a corresponding action for the voice-mail box in the voice-mail system.

17. The method of claim 16, wherein:
the polling step is performed by a poller component of the e-mail system; and
the event handler is a connector component of the voice-mail system.

18. The method of claim 16, further comprising the steps of:
when a message event occurs in the voice-mail system, the event handler creating a file in the voice-mail system for the message event, the created file having a file name that includes a create date-time stamp of the occurrence of the message event and the type of the message event;
when the corresponding message transaction is effected in the e-mail system, deleting the file in the voice-mail system; and
when the date-time stamp of the created file is older than a predetermined value, the event handler logging in to the corresponding e-mail box to again effect a corresponding message transaction in the e-mail system.

19. The method of claim 17, further comprising the steps of:
periodically for a first pre-determined periodicity starting the connector and poller components, if they are not already running; and
periodically for a second pre-determined periodicity performing the steps of:
when a current system time is before a shutdown and after a restart, starting the connector and poller components if they are not already running, and
  i. when a current system time is before a shutdown and before a restart, shutting down the connector and poller components if they are running.

* * * * *